(12) United States Patent
Park et al.

(10) Patent No.: US 8,999,579 B2
(45) Date of Patent: Apr. 7, 2015

(54) SURFACE TREATED ANODE ACTIVE MATERIAL AND METHOD OF MAKING THE SAME, ANODE INCLUDING THE SAME, AND LITHIUM BATTERY INCLUDING THE SAME

(75) Inventors: Joung-won Park, Seongnam-si (KR); Yoon-sok Kang, Seongnam-si (KR); Han-su Kim, Seoul (KR); Jae-gu Yoon, Suwon-si (KR); Gue-sung Kim, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 1777 days.

(21) Appl. No.: 12/255,078

(22) Filed: Oct. 21, 2008

(65) Prior Publication Data

US 2009/0155692 A1 Jun. 18, 2009

(30) Foreign Application Priority Data

Dec. 18, 2007 (KR) .......................... 10-2007-0133603

(51) Int. Cl.
*H01M 4/485* (2010.01)
*C01G 23/00* (2006.01)
(Continued)

(52) U.S. Cl.
CPC ............. *H01M 4/485* (2013.01); *C01G 23/003* (2013.01); *C01G 23/005* (2013.01); *C04B 35/62805* (2013.01); *C04B 35/62818* (2013.01); *C04B 35/62826* (2013.01); *C04B 35/62886* (2013.01); *C04B 35/62897* (2013.01); *H01M 4/366* (2013.01); *H01M 4/525* (2013.01); *C01P 2002/85* (2013.01); *C01P 2004/61* (2013.01); *C01P 2006/40* (2013.01);
(Continued)

(58) Field of Classification Search
CPC ....................................................... H01M 4/485
USPC ........................................... 429/231.1, 231.5
See application file for complete search history.

(56) References Cited

U.S. PATENT DOCUMENTS

| | | | |
|---|---|---|---|
| 6,258,486 B1 * | 7/2001 | Fauteux et al. ................ | 429/232 |
| 6,337,160 B1 | 1/2002 | Hilarius et al. | |
| 8,343,666 B2 | 1/2013 | Muraoka et al. | |
| 2001/0055717 A1 | 12/2001 | Fauteux et al. | |

(Continued)

FOREIGN PATENT DOCUMENTS

| | | |
|---|---|---|
| JP | 2001-043847 | 2/2001 |
| JP | 2003-137547 | 5/2003 |

(Continued)

OTHER PUBLICATIONS

KIPO Notice of Allowance dated Aug. 28, 2014, for Korean priority Patent application 10-2007-0133603, (6 pages).

(Continued)

*Primary Examiner* — Tracy Dove
(74) *Attorney, Agent, or Firm* — Christie, Parker & Hale, LLP

(57) ABSTRACT

An anode includes a collector; and an anode active material layer disposed on the collector comprises an anode active material, which is lithium oxide coated $Li_4Ti_5O_{12}$, a conductive material, and a binder, wherein the lithium oxide intercalates and/or deintercalates lithium ions into and from the lattice structure of $Li_4Ti_5O_{12}$. By coating the surface of the anode active material with lithium oxide, an anode including the surface-treated anode active material has a high capacity, high-rate properties, and a high initial efficiency.

10 Claims, 6 Drawing Sheets

(51) Int. Cl.
*C04B 35/628* (2006.01)
*H01M 4/36* (2006.01)
*H01M 4/525* (2010.01)
H01M 4/62 (2006.01)
H01M 10/0525 (2010.01)

(52) U.S. Cl.
CPC .................. *C04B 2235/3203* (2013.01); *C04B 2235/3234* (2013.01); *C04B2235/5445* (2013.01); *H01M 4/625* (2013.01); *H01M 10/0525* (2013.01); *Y02E 60/122* (2013.01)

(56) References Cited

U.S. PATENT DOCUMENTS

| | | | |
|---|---|---|---|
| 2004/0081889 A1 | 4/2004 | Lee et al. | |
| 2005/0244715 A1 | 11/2005 | Cho et al. | |
| 2007/0072080 A1* | 3/2007 | Inagaki et al. | 429/231.1 |
| 2009/0081554 A1 | 3/2009 | Takada et al. | |

FOREIGN PATENT DOCUMENTS

| | | |
|---|---|---|
| JP | 2004-095325 | 3/2004 |
| JP | 2004-235144 | 8/2004 |
| KR | 2000-0070617 A | 11/2000 |
| KR | 10-0551069 B | 2/2006 |
| KR | 10-0590096 B | 6/2006 |
| KR | 2007-0071732 A | 7/2007 |
| WO | WO 2007/004590 | 1/2007 |

OTHER PUBLICATIONS

JPO Office action dated Jul. 30, 3013, for corresponding Japanese Patent application 2008-322687, (3 pages).

Patent Abstracts of Japan, and English machine translation of Japanese Publication 2003-137547 dated May 14, 2003, (13 pages).

Patent Abstracts of Japan, and English machine translation of Japanese Publication 2004-095325 dated Mar. 25, 2004, (26 pages).

* cited by examiner

SURFACE TREATED ANODE ACTIVE MATERIAL AND METHOD OF MAKING THE SAME, ANODE INCLUDING THE SAME, AND LITHIUM BATTERY INCLUDING THE SAME

CROSS-REFERENCE TO RELATED APPLICATIONS

This application claims the benefit of Korean Patent Application No. 2007-133603, filed on Dec. 18, 2007, in the Korean Intellectual Property Office, the disclosure of which is incorporated herein by reference.

BACKGROUND OF THE INVENTION

1. Field of the Invention

Aspects of the present invention relate to an anode including a surface-treated anode active material and a lithium battery including the same, and more particularly, to an anode including a surface-treated anode active material in which lithium oxide is coated on a surface of the anode active material, the resultant anode having a high capacity, high-rate properties, a high initial efficiency, and a lithium battery including the same.

2. Description of the Related Art

Conventional lithium batteries include metallic lithium as an anode active material. However, metallic lithium forms dendrites, and thus, a battery can short-circuit and explode. Therefore, various kinds of anode active materials including a carbonaceous material are being developed to replace metallic lithium.

Among anode active materials, $Li_4Ti_5O_{12}$ is inexpensive, stable, and can be easily prepared. However, $Li_4Ti_5O_{12}$ has a low conductivity, and thus, $Li_4Ti_5O_{12}$ has a low initial efficiency, low capacity per volume, and low energy density.

To solve these and/or other problems, $Li_4Ti_5O_{12}$ can be formed as nanoparticles; $Li^+$ or $Ti^{4+}$ of $Li_4Ti_5O_{12}$ can be substituted with a metallic ion having a large oxidation number, such as $V^{5+}$, $Mn^{4+}$, $Fe^{3+}$, $Ni^{2+}$, $Cr^{3+}$, and $Mg^{2+}$; or $Li_4Ti_5O_{12}$ can be formed in a semi-conductive carbon complex.

SUMMARY OF THE INVENTION

Aspects of the present invention provide an anode including a surface-treated anode active material, having high initial efficiency and excellent cyclic properties. Aspects of the present invention also provide a lithium battery including the anode.

According to an aspect of the present invention, there is provided an anode including a collector; and an anode active material layer which includes an anode active material, a conductive material, and a binder and is formed on the collector, in which the anode active material includes $Li_4Ti_5O_{12}$ coated with lithium oxide that intercalates and/or deintercalates lithium ions into and from the lattice structure of $Li_4Ti_5O_{12}$.

According to an embodiment of the present invention, the lithium oxide can be lithium niobate ($LiNbO_3$). According to an embodiment of the present invention, the amount of the lithium niobate may be in a range of 0.01 to 1.5 wt % based on the weight of the anode active material. According to an embodiment of the present invention, the surface coating layer of the lithium niobate may have a thickness of 1 to 100 nm. According to an embodiment of the present invention, the collector can be copper.

According to an aspect of the present invention, there is provided a lithium battery including a cathode, an anode, and an electrolyte, in which the anode includes $Li_4Ti_5O_{12}$ coated with lithium oxide that intercalates and/or deintercalates lithium ions into and from the lattice structure of $Li_4Ti_5O_{12}$.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1A:
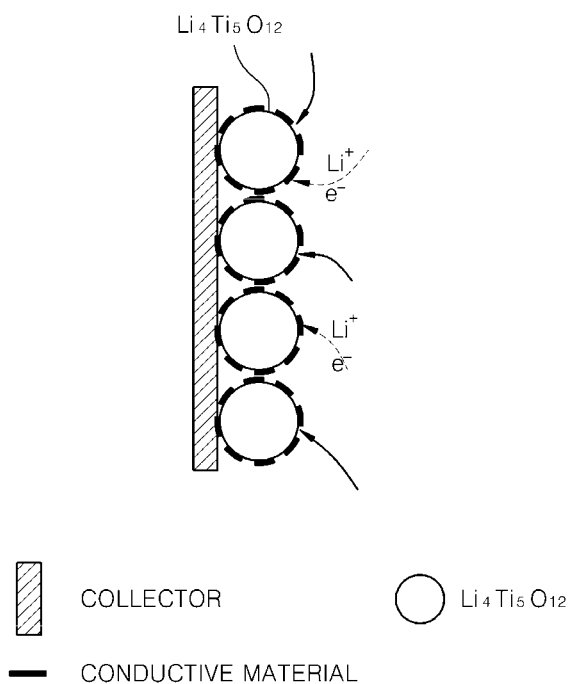
FIGS. 1A and 1B are schematic views illustrating flow of lithium ions at a conventional anode plate and an anode plate according to aspects of the present invention, respectively.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

An anode according to aspects of the present invention includes $Li_4Ti_5O_{12}$ as an anode active material, in which lithium ions are intercalated and/or from which lithium ions are deintercalated. The anode active material is coated with a lithium oxide on a surface of the anode active material, and thus, the anode can obtain a high capacity, high-rate properties, and a high initial efficiency.

The anode according to aspects of the present invention includes a collector and an anode active material layer formed on the collector. The anode active material layer includes an anode active material, a conductive material, and a binder, in which the anode active material includes $Li_4Ti_5O_{12}$ that is coated with lithium oxide. The anode active material more efficiently intercalates and/or deintercalates lithium ions.

Figure 1B:
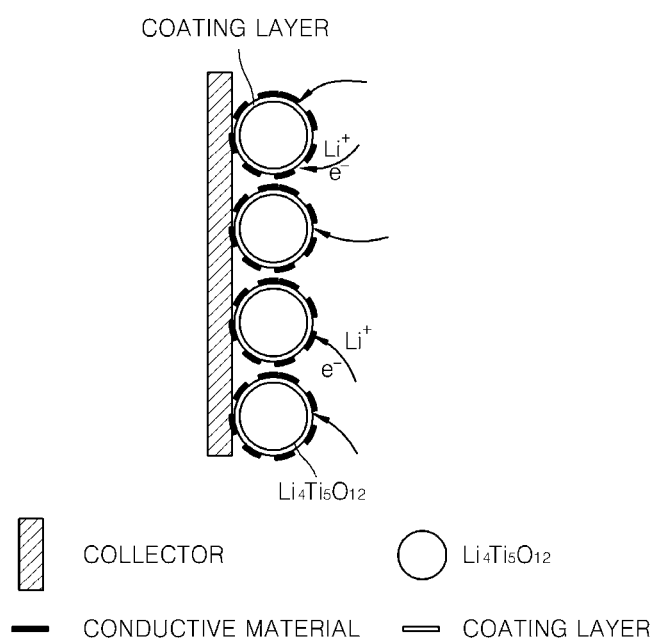

The lithium oxide coated on a surface of $Li_4Ti_5O_{12}$ increases the intercalation and deintercalation of lithium ions into and from the lattice structure of $Li_4Ti_5O_{12}$, and thus lithium ions can more easily move to be stored or moved from the anode active material during charging and discharging. As a result, the initial efficiency and cycle properties of $Li_4Ti_5O_{12}$ can be improved. Specifically, as illustrated in FIG. 1A, in the case of an anode assembly that is not coated with the lithium oxide, the surface of $Li_4Ti_5O_{12}$ is partially surrounded by carbon black, which is a conductive material. Therefore, portions of $Li_4Ti_5O_{12}$ which do not contact the conductive material have low electronic conductivity and low ionic conductivity, and lithium ions do not efficiently enter the structure of $Li_4Ti_5O_{12}$, i.e., the dotted arrows in FIG. 1A represent ions that are intercalated into the lattice structure of the $Li_4Ti_5O_{12}$ and the solid arrows represent ions that are not intercalated. On the other hand, in the case of an anode assembly that is coated with lithium oxide, as shown in FIG. 1B, the lithium oxide having excellent ionic conductivity is coated on the surface of $Li_4Ti_5O_{12}$. Thus, even in portions of the $Li_4Ti_5O_{12}$ that do not contact the conductive material, electrons and lithium ions can easily move to and be easily stored in the lattice structure of $Li_4Ti_5O_{12}$, i.e., the solid arrows in FIG. 1B represent ions that are intercalated into the lattice structure of the $Li_4Ti_5O_{12}$. As a result, an initial efficiency and cyclic properties of the anode can be improved.

Therefore, the surface of $Li_4Ti_5O_{12}$ according to aspects of the present invention may be coated with a lithium oxide that intercalates and/or deintercalates lithium ions into and/or from the lattice structure of $Li_4Ti_5O_{12}$, and the obtained lithium oxide surface coating layer may be homogeneously formed, and specifically, may be continuous or discontinuous.

The lithium oxide coated on the surface of $Li_4Ti_5O_{12}$ can be any material that increases the intercalation and deintercalation of lithium ions to and from the lattice structure of $Li_4Ti_5O_{12}$. Such lithium oxide may be lithium niobate ($LiNbO_3$), $Li_xVO_2$ ($0<x\leq1$), or $Li_{1-x}NiO_2$ ($0\leq x<1$). For example, the lithium oxide may be lithium niobate that efficiently transfers lithium ions at voltages of 2V or lower.

The lithium oxide surface coating layer may have various thicknesses and various amounts according to the concentration of a coating solution. When the thickness or amount of the surface coating layer is too thick or great, the surface coating layer has low conductivity and thus high-rate properties can be degraded. Therefore, there is a need to determine the amount and/or thickness according to performance of a lithium battery. The amount of lithium oxide that intercalates and/or deintercalates lithium ions into and/or from the $Li_4Ti_5O_{12}$ particles may be in a range of 0.01 to 1.5 wt %, and specifically 0.1 to 0.5 wt %, based on the weight of the anode active material. When the coating layer of lithium oxide has an amount of less than 0.01 wt % based on the weight of the anode active material, desired effects are not obtained. On the other hand, when the coating layer of lithium oxide has an amount of more than 1.5 wt % based on the weight of the anode active material, high-rate properties may be degraded. In consideration of such amount range, the thickness of the surface coating layer may be in a range of 1 to 100 nm.

$Li_4Ti_5O_{12}$ on which the lithium oxide is coated is a powder material having a particle diameter of nanometers to micrometers, for example, 1 nm to 1,000 μm. For example, the anode active material according to aspects of the present invention can be $Li_4Ti_5O_{12}$ powder having a particle size of tens of nanometers or 3 μm, or several nanometers to 300 nm.

A method of surface-coating lithium oxide that intercalates or deintercalates lithium ions on particles of $Li_4Ti_5O_{12}$ into and/or from the lattice structure of $Li_4Ti_5O_{12}$ is hereafter described. First, a lithium source, such as metallic lithium, and a niobium source, such as niobium alkoxide, are dissolved in an organic solvent to prepare a precursor solution. The precursor solution is sprayed to the surface of particles of $Li_4Ti_5O_{12}$, or particles of $Li_4Ti_5O_{12}$ may be immersed in the precursor solution and then filtered. The filtered product is sintered in air at a temperature of 400 to 500° C. for 0.5 to 1 hour to obtain particles of $Li_4Ti_5O_{12}$ that are coated with a lithium oxide that intercalates or deintercalates lithium ions into the lattice structure of $Li_4Ti_5O_{12}$.

As described above, $Li_4Ti_5O_{12}$ that is surface-treated with lithium oxide that intercalates or deintercalates lithium ions into the $Li_4Ti_5O_{12}$ particles forms an anode active material layer together with a conductive material, and a binder. The anode active material layer is formed on a collector to form an anode. The collector of the anode may be a copper, nickel, or SUS collector, and specifically a copper collector.

A method of preparing the anode active material layer formed on the collector will now be described. An anode active material, a conductive material, a binder, and a solvent are mixed to prepare an anode active material composition. The anode active material composition may be directly coated on a collector to obtain an anode active material layer. Alternatively, the anode active material composition can be cast onto a separate support and an anode active material film removed from the separate support is laminated on a collector to obtain an anode active material layer.

The conductive material that is used to prepare the anode active material layer may be carbon black, the binder may be vinylidene fluoride/hexafluoropropylene copolymer, polyvinylidenefluoride, polyacrylonitrile, polymethylmethacrylate, polytetrafluoroethylene, a mixture thereof, or styrene butadiene rubber-based polymer, and the solvent may be N-methylpyrrolidone, acetone, or water.

In this regard, amounts of the surface-treated anode active material, conductive material, binder, and solvent may be the same as in conventional lithium batteries.

The surface-treated anode according to aspects of the present invention obtained as described above may be suitable for lithium batteries. A method of preparing a lithium battery according to aspects of the present invention will now be described in detail.

First, the surface-treated anode active material described above, a conductive material, a binder, and a solvent are mixed to prepare an anode composition and the anode composition may be directly coated on a collector to obtain an anode plate. Alternatively, the anode composition can be cast onto a separate support and an anode composition film removed from the separate support is laminated on a copper collector to obtain an anode plate. The obtained anode plate is surface-treated with an amine group-containing compound to obtain a surface-treated anode.

Like the anode plate, a cathode active material, a conductive material, a binder, and a solvent are mixed to prepare a cathode active material composition. The cathode active material composition may be directly coated on an aluminum collector and dried to obtain a cathode plate. Alternatively, the cathode active material composition can be cast onto a separate support and a film removed from the support is laminated on an aluminum collector to obtain a cathode plate.

The cathode active material may be any lithium-containing metal oxide that is used in the art. For example, the cathode active material may be $LiCoO_2$, $LiMn_xO_{2x}$, $LiNi_{x-1}Mn_xO_{2x}$ (x=1, 2), or $LiNi_{1-x-y}Co_xMn_yO_2$ ($0\leq x\leq 0.5$, $0\leq y\leq 0.5$). A cathode active material composition may include a similar conductive material, a binder, and a solvent as in the anode. In this regard, amounts of the cathode active material, conductive material, binder, and solvent may be the same as in conventional lithium batteries.

In some cases, the cathode electrode active material composition and the anode electrode active material composition may further include a plasticizer so as to form pores inside an electrode plate.

A separator may be any separator that is used in conventional lithium batteries. Specifically, the separator may have low resistance to flow of electrolyte ions and a high electrolyte-retaining ability. For example, the separator may be selected from the group consisting of glass fiber, polyester, Teflon®, polyethylene, polypropylene, polytetrafluoroethylene (PTFE), and combinations thereof, each of which may be a woven or non-woven fabric. Specifically, a foldable separator formed of polyethylene or polypropylene may be suitable for lithium ion batteries, and a separator having an excellent organic electrolyte-retaining ability may be suitable for lithium ion polymer batteries. A method of preparing these separators will now be described in detail.

A polymer resin, filler, and a solvent are mixed to prepare a separator composition, and the separator composition may be directly coated on an electrode and dried to obtain a separator film. Alternatively, the separator composition may be cast onto a support and dried, and then a separator film removed from the support is laminated on an electrode.

The polymer resin is not limited, and can be any binder that is used in an electrode plate. For example, the polymer resin may be vinylidenefluoride/hexafluoropropylene copolymer, polyvinylidenefluoride, polyacrylonitrile, polymethylmethacrylate, and mixtures thereof. In particular, the polymer resin may be vinylidenefluoride/hexafluoropropylene copolymer in which the amount of hexafluoropropylene is in a range of 8 to 25 parts by weight.

The separator is placed between the cathode and the anode to form a battery assembly. The battery assembly is wound or folded to be placed in a cylindrical battery case or a rectangular battery case, and then an organic electrolyte is injected thereto, thus completing manufacture of a lithium ion battery. Meanwhile, a plurality of such battery assemblies can be stacked in a multi-cell structure, and then immersed in an organic electrolyte. The obtained structure is placed in a pouch and sealed. As a result, a lithium ion polymer battery is manufactured.

The organic electrolyte may be a lithium salt and an organic solvent mixture including a solvent that has a large dielectric constant and a solvent having a low boiling point. In some cases, the organic electrolyte may further include various additives, such as an overcharging preventer.

The solvent that has a large dielectric constant used in the organic electrolyte may be any solvent that has a large dielectric constant. Such solvent can be a cyclic carbonate, such as ethylene carbonate, propylene carbonate, or butylene carbonate; or a gamma-butyrolactone.

The solvent having a low boiling point can be any solvent that has a low boiling point. Such solvent can be a chain carbonate, such as dimethyl carbonate, ethylmethyl carbonate, diethyl carbonate, or dipropyl carbonate; dimethoxyethane; diethoxyethane; or a fatty acid ester derivative, but is not limited thereto.

The solvent that has a large dielectric constant and the solvent that has a low boiling point may be substituted with a halogen atom, such as fluorine.

The mixture ratio of the solvent that has a large dielectric constant to the solvent having a low boiling point may be in a range of 1:1 to 1:9. When the mixture ratio is outside that range, sufficient discharge capacity and sufficient charging and discharging lifetime may not be obtained.

Also, the lithium salt used in the organic electrolyte can be any lithium salt that is used in lithium batteries in the art. For example the lithium salt can include at least one lithium salt selected from the group consisting of $LiClO_4$, $LiCF_3SO_3$, $LiPF_6$, $LiN(CF_3SO_2)$, $LiBF_4$, $LiC(CF_3SO_2)_3$, and $LiN(C_2F_5SO_2)_2$.

The concentration of the lithium salt in the organic electrolyte may be in a range of 0.5 to 2M. When the concentration of the lithium salt is less than 0.5M, conductivity of the organic electrolyte may be decreased and the performance of the organic electrolyte may be degraded. On the other hand, when the concentration of the lithium salt is greater than 2.0M, the viscosity of the organic electrolyte may be increased and mobility of lithium ions may be decreased.

Aspects of the present invention will be described in further detail with reference to the following examples. These examples are for illustrative purposes only and are not intended to limit the scope of the aspects of the present invention.

Preparation of Anode Active Material

Synthesis Example 1

0.025 mmol of metallic lithium (a lithium source) and 0.025 mmol of niobium pentaethoxide (a niobium source) were dissolved in 100 ml of ethanol to prepare a precursor solution. 5 g of $Li_4Ti_5O_{12}$ powder having a particle size of several tens of nm to 3 μm was immersed in the precursor solution for 5 minutes and then filtered. The filtered product was sintered in air at 400° C. for 30 minutes to obtain $Li_4Ti_5O_{12}$ surface-coated with lithium niobate. The amount of lithium niobate which formed a surface coating layer was 0.3 wt % based on the total weight of the anode active material, and the thickness of the surface coating layer was several nm.

Figure 2:
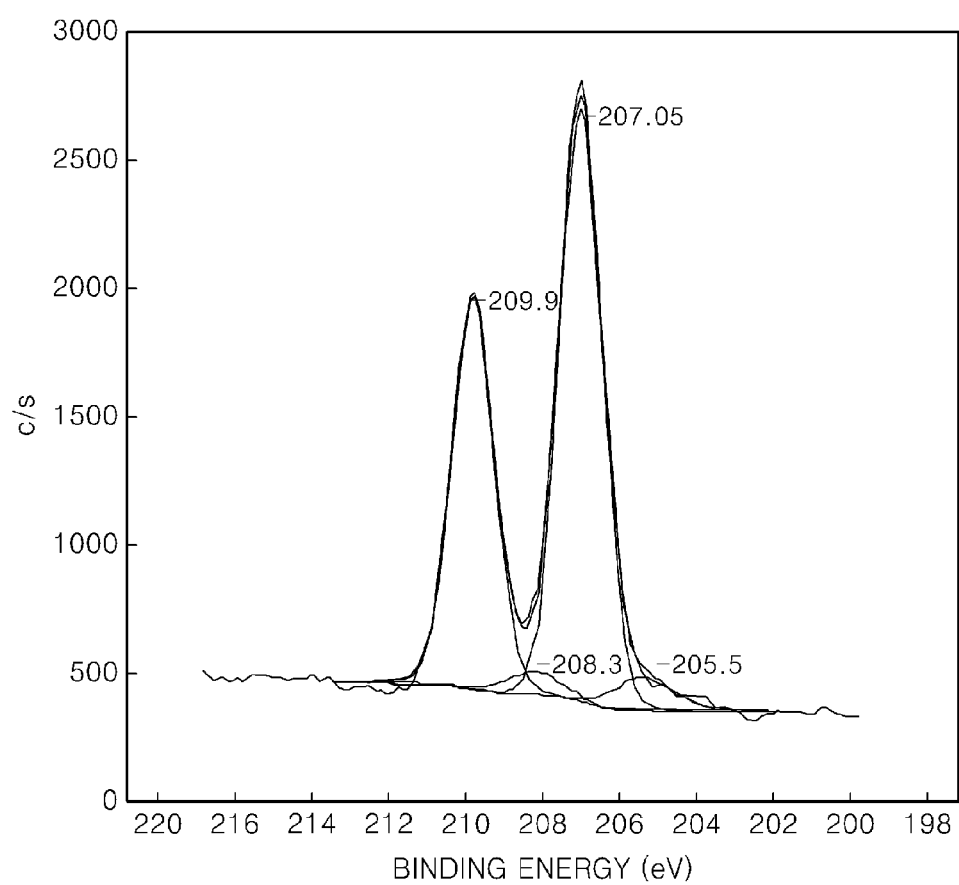
FIG. 2 is a graph showing x-ray photon spectroscopy results of $Li_4Ti_5O_{12}$ surface-treated with lithium niobate, prepared according to Synthesis Example 1.

FIG. 2 is a graph showing x-ray photoelectron spectroscopy (XPS) results of the $Li_4Ti_5O_{12}$ surface-treated with lithium niobate of Synthesis Example 1. Referring to FIG. 2, there were two peaks (207.05, 209.9), which indicate the existence of $LiNbO_3$.

Synthesis Example 2

0.1 mmol of metallic lithium (a lithium source) and 0.1 mmol of niobium pentaethoxide (a niobium source) were dissolved in 100 ml of ethanol to prepare a precursor solution. 5 g of $Li_4Ti_5O_{12}$ powder having a particle size of several tens of nm to 3 μm was immersed in the precursor solution for 5 minutes and then filtered. The filtered product was sintered in air at 400° C. for 30 minutes to obtain $Li_4Ti_5O_{12}$ surface-coated with lithium niobate. The amount of lithium niobate which formed a surface coating layer was 0.6wt % based on the total weight of the anode active material, and the thickness of the surface coating layer was several nm.

Synthesis Example 3

0.2 mmol of metallic lithium (a lithium source) and 0.2 mmol of niobium pentaethoxide (a niobium source) were dissolved in 100 ml of ethanol to prepare a precursor solution. 5 g of $Li_4Ti_5O_{12}$ powder having a particle size of several tens of nm to 3 μm was immersed in the precursor solution for 5 minutes and then filtered. The filtered product was sintered in air at 400° C. for 30 minutes to obtain $Li_4Ti_5O_{12}$ surface-coated with lithium niobate. The amount of lithium niobate which formed a surface coating layer was 1.2 wt % based on the total weight of the anode active material, and the thickness of the surface coating layer was several tens of nm.

Synthesis Example 4

0.2 mmol of metallic lithium (a lithium source) and 0.2 mmol of niobium pentaethoxide (a niobium source) were dissolved in 100 ml of ethanol to prepare a precursor solution. 5 g of $Li_4Ti_5O_{12}$ powder having a particle size of several nm to 300 nm was immersed in the precursor solution for 5 minutes and then filtered. The filtered product was sintered in air at 400° C. for 30 minutes to obtain $Li_4Ti_5O_{12}$ surface-coated with lithium niobate. The amount of lithium niobate which formed a surface coating layer was 1.2 wt % based on the total weight of the anode active material, and the thickness of the surface coating layer was more than a dozen nm.

Preparation of an Anode

Comparative Example 1

8.2 g of $Li_4Ti_5O_{12}$ powder having a particle size of several tens of nm to 3 μm, 1 g of graphite powder, and 8 g of PVDF 10 wt % solution (solvent:N-methylpyrrolidone) were mixed and stirred using a mechanical stirrer to obtain slurry. The obtained slurry was coated to a thickness of about 60 μm on a copper (Cu) collector using a doctor blade, dried, and then dried in a vacuum at 120° C. to prepare an anode plate.

Comparative Example 2

$Li_4Ti_5O_{12}$ active material having a particle size of several tens of nm to 3 μm was sintered in air at 400° C. for 30 minutes to prepare an anode active material. 8.2 g of the sintered $Li_4Ti_5O_{12}$ powder, 1 g of graphite powder, and 8 g of PVDF 10 wt % solution (solvent:N-methylpyrrolidone) were mixed and stirred using a mechanical stirrer to prepare slurry. The obtained slurry was coated to a thickness of about 60 μm on a copper (Cu) collector using a doctor blade, dried, and then dried in a vacuum at 120° C. to prepare an anode plate.

Comparative Example 3

8.2 g of $Li_4Ti_5O_{12}$ powder having a particle size of several nm to 300 nm, 1 g of graphite powder, and 8 g of PVDF 10 wt % solution (solvent:N-methylpyrrolidone) were mixed and stirred using a mechanical stirrer to obtain slurry. The obtained slurry was coated to a thickness of about 60 μm on a copper (Cu) collector using a doctor blade, dried, and then dried in a vacuum at 120° C. to prepare an anode plate.

Anode Example 1

8.2 g of surface-treated $Li_4Ti_5O_{12}$ powder prepared according to Synthesis Example 1, 1 g of graphite powder, and 8 g of PVDF 10 wt % solution (solvent:N-methylpyrrolidone) were mixed and stirred using a mechanical stirrer to obtain slurry. The obtained slurry was coated to a thickness of about 60 μm on a copper (Cu) collector using a doctor blade, dried, and then dried in a vacuum at 120° C. to prepare an anode plate.

Anode Example 2

8.2 g of surface-treated $Li_4Ti_5O_{12}$ powder prepared according to Synthesis Example 2, 1 g of graphite powder, and 8 g of PVDF 10 wt % solution (solvent:N-methylpyrrolidone) were mixed and stirred using a mechanical stirrer to obtain slurry. The obtained slurry was coated to a thickness of about 60 μm on a copper (Cu) collector using a doctor blade, dried, and then dried in a vacuum at 120° C. to prepare an anode plate.

Anode Example 3

8.2 g of surface-treated $Li_4Ti_5O_{12}$ powder prepared according to Synthesis Example 3, 1 g of graphite powder, and 8 g of PVDF 10 wt % solution (solvent:N-methylpyrrolidone) were mixed and stirred using a mechanical stirrer to obtain slurry. The obtained slurry was coated to a thickness of about 60 μm on a copper (Cu) collector using a doctor blade, dried, and then dried in a vacuum at 120° C. to prepare an anode plate.

Anode Example 4

8.2 g of surface-treated $Li_4Ti_5O_{12}$ powder prepared according to Synthesis Example 4, 1 g of graphite powder, and 8 g of PVDF 10 wt % solution (solvent:N-methylpyrrolidone) were mixed and stirred using a mechanical stirrer to obtain slurry. The obtained slurry was coated to a thickness of about 60 μm on a copper (Cu) collector using a doctor blade, dried, and then dried in a vacuum at 120° C. to prepare an anode plate.

Battery Assembly

A 2016 coin cell was prepared using each of the anode plate prepared according to Anode Examples 1 to 4 and Comparative Examples 1 to 4, a metallic lithium counter electrode, a PTFE separator, an electrolyte prepared by dissolving 1.3 M $LiPF_6$ in a solvent mixture of EC (ethylene carbonate) and DEC (diethyl carbonate) at a volume ratio of 7:3.

Experimental Example

Battery Performance Test

Constant-current discharging was performed on each of the coin cells prepared as descried above using an active material 0.2D current (discharge current) until a voltage reached 1V with respect to lithium electrode. When the coin cell was completely discharged, the coin cell was left to sit for about 10 minutes. Then, constant-current charging was performed on the coin cell using 0.2C current (charge current) until the voltage reached 2 V. Initial efficiency was measured using the discharge amount/charge amount. Then, charging and discharging were performed twice for each battery at 0.2C/0.2D, 0.2C/0.5D, 0.5C/0.5D, 1C/0.5D, and 6C/0.5D. A 0.2C→6C capacity decrease rate was measured using a ratio of a charge capacity of 0.2C/0.5D to a charge capacity of 6C/0.5D. The results are shown in Table 1, and FIGS. 3 to 5.

TABLE 1

|  | Comparative Example 1 | Comparative Example 2 | Comparative Example 3 | Anode Example 1 | Anode Example 2 | Anode Example 3 | Anode Example 4 |
|---|---|---|---|---|---|---|---|
| Active material sintering temperature | — | — | 400° C. | 400° C. | 400° C. | 400° C. | 400° C. |
| Active material surface treatment | — | — | — | 0.25 | 1 | 2 | 2 |

TABLE 1-continued

| | Comparative Example 1 | Comparative Example 2 | Comparative Example 3 | Anode Example 1 | Anode Example 2 | Anode Example 3 | Anode Example 4 |
|---|---|---|---|---|---|---|---|
| concentration (mmol) | | | | | | | |
| 0.2C/0.2D Initial capacity (mAh/g) | 139 | 159 | 145 | 155 | 162 | 153 | 174 |
| 0.2C/0.2D initial efficiency(%) | 96 | 79 | 99 | 98 | 97 | 98 | 87 |
| Initial capacity increase rate (%) | — | — | 4.3 | 11.5 | 13.7 | 10.1 | 11 |
| 0.2C → 6C capacity increase rate (%) | 1.36 | 0 | 16.18 | 4.45 | 10.17 | 9.49 | 0 |

Figure 3:
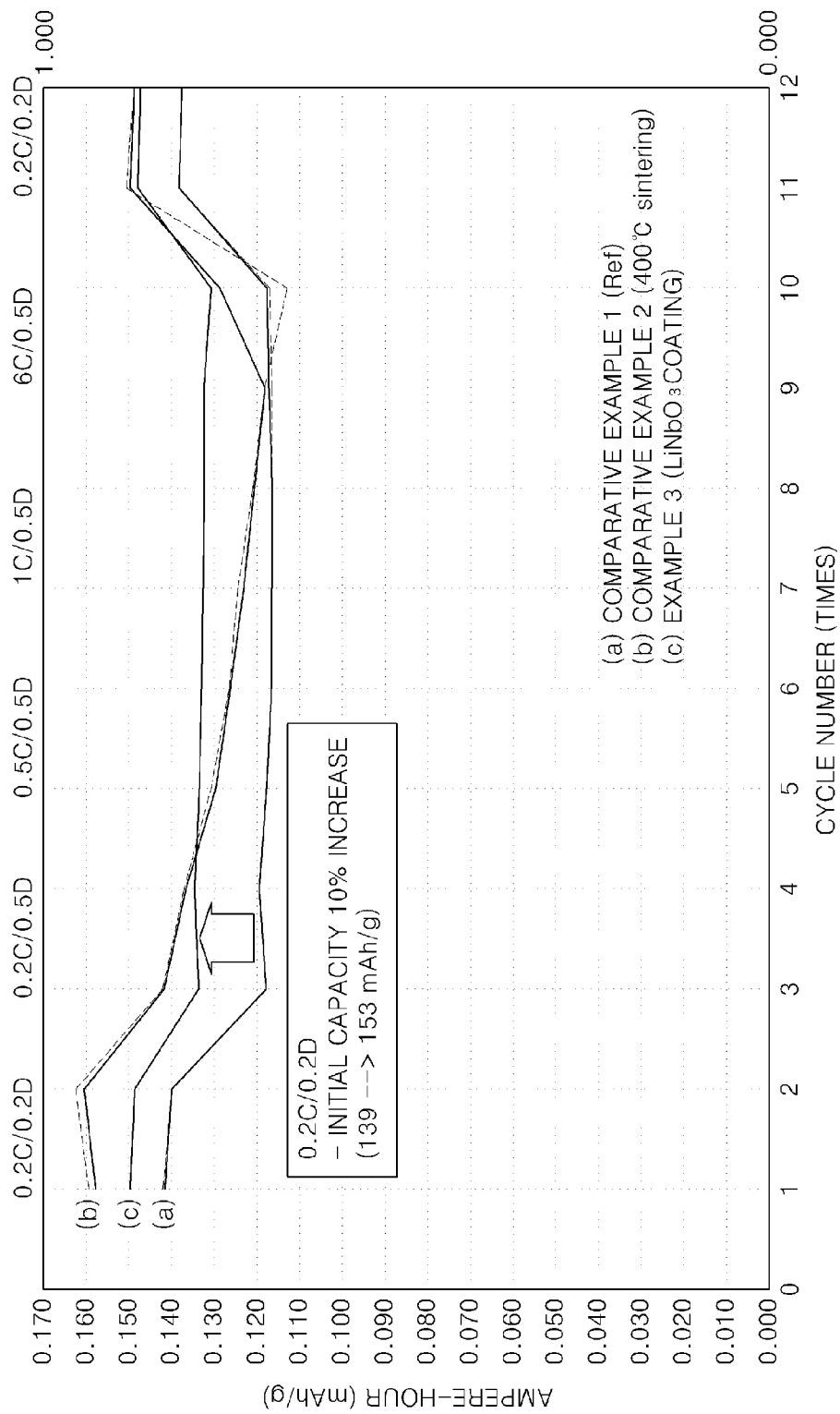
FIG. 3 is a graph of an initial capacity of the lithium batteries prepared according to Comparative Examples 1 and 2 and Example 3.
Figure 4:
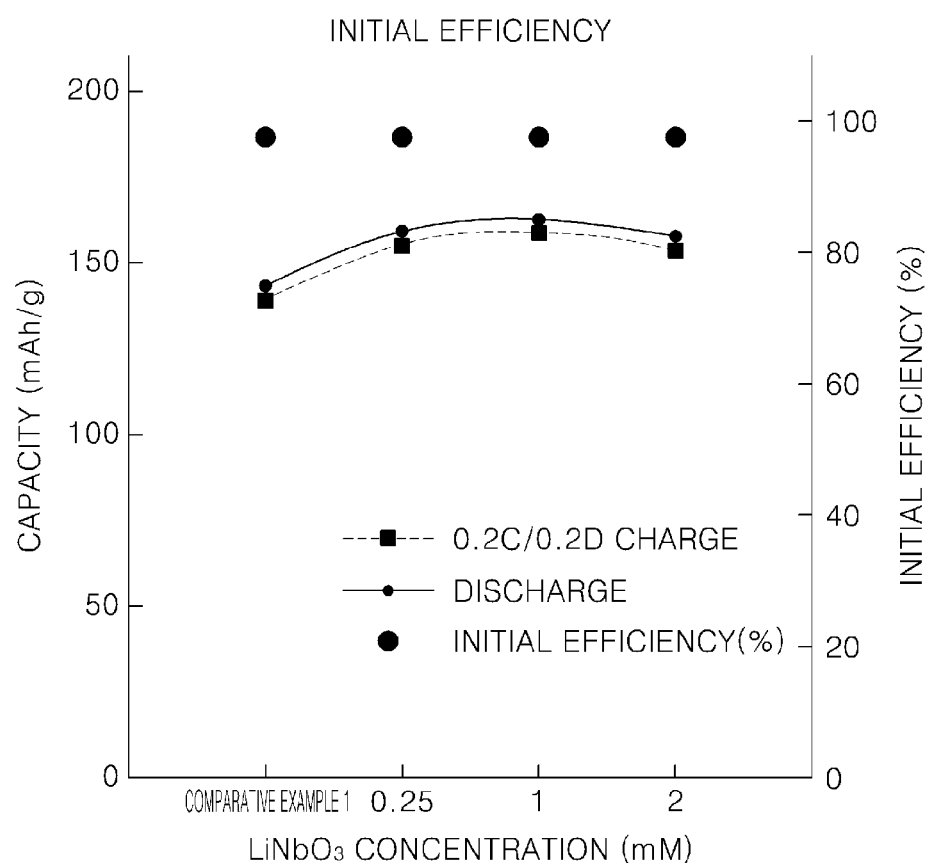
FIG. 4 is a graph of an initial efficiency of the lithium batteries prepared according to Comparative Example 1, and Examples 1-3.
Figure 5:
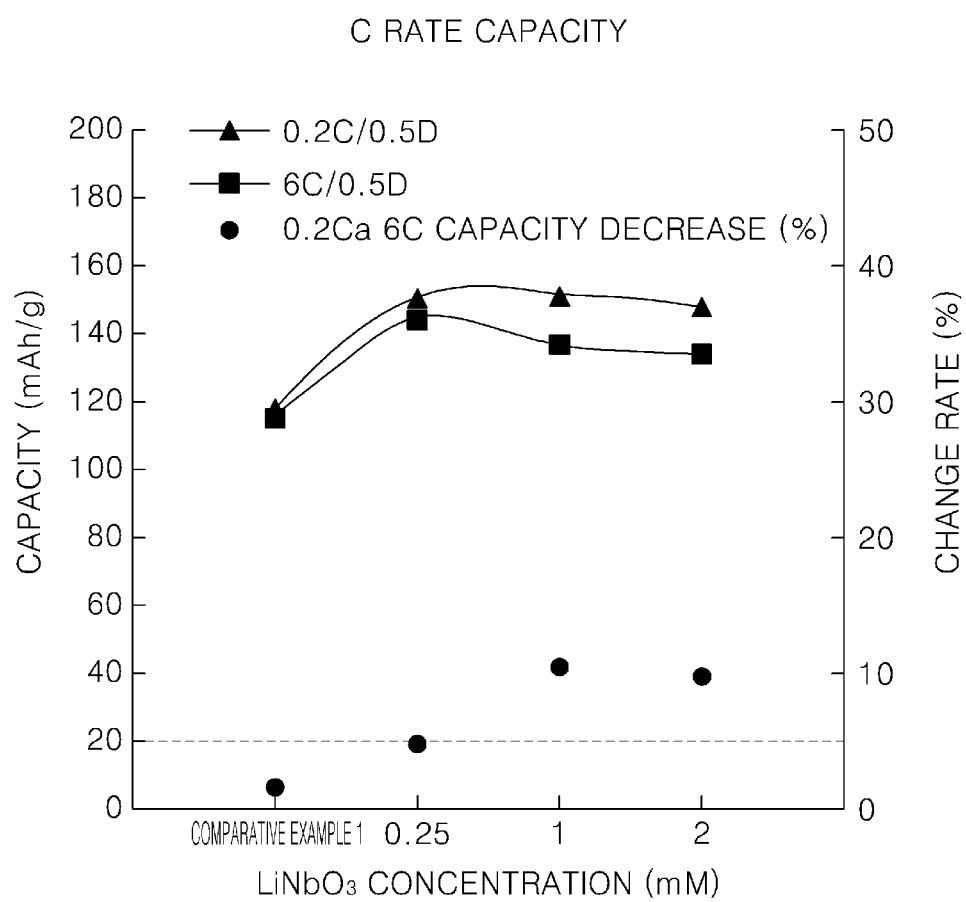
FIG. 5 is a graph of high-rate properties of the lithium batteries prepared according to Comparative Example 1, and Examples 1-3.

Referring to Table 1 and FIGS. 3 to 5, the anode plates prepared according to Examples 1 to 4 in which the surface of $Li_4Ti_5O_{12}$ was treated with lithium niobate has an initial capacity increase rate of about 10% and high initial efficiency. In addition, such effects were maintained constant even when C rate was increased.

A surface-treated anode according to aspects of the present invention having an anode active material including $Li_4Ti_5O_{12}$, which is coated with lithium oxide that intercalates and/or deintercalates lithium ions into and from the lattice structure of $Li_4Ti_5O_{12}$, results in a lithium battery including such surface-treated anode has high capacity, high-rate properties, and high initial efficiency.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An anode, comprising:
    a collector; and
    an anode active material layer disposed on the collector, the anode active material layer comprising:
        an anode active material comprising $Li_4Ti_5O_{12}$ coated with a lithium oxide that intercalates and deintercalates lithium ions into and from the $Li_4Ti_5O_{12}$,
        a conductive material, and
        a binder,
    wherein the lithium oxide is present at 0.01 to 0.6 wt % based on the weight of the anode active material.

2. The anode of claim 1, wherein the lithium oxide is lithium niobate.

3. The anode of claim 2, wherein a surface coating layer formed of the lithium niobate has a thickness of 0.1 to 100 nm.

4. The anode of claim 1, wherein the $Li_4Ti_5O_{12}$ has a particle size of 1 nm to 1,000 μm.

5. The anode of claim 4, wherein the lithium oxide is homogeneously formed on surfaces of the $Li_4Ti_5O_{12}$ particles.

6. The anode of claim 4, wherein the lithium oxide completely coats the $Li_4Ti_5O_{12}$ particles.

7. The anode of claim 6, wherein the conductive material partially coats the lithium oxide coated $Li_4Ti_5O_{12}$.

8. The anode of claim 1, wherein the lithium oxide is $Li_xVO_2$ ($0<x\leq1$) or $Li_{1-x}NiO_2$ ($0\leq x<1$).

9. The anode of claim 1, wherein the conductive material is carbon black.

10. A lithium battery, comprising:
    a cathode;
    the anode of claim 1; and
    an electrolyte.

* * * * *